July 30, 1940.  H. S. CLARK ET AL  2,209,597
APPARATUS FOR HAND WEAVING
Filed April 16, 1936   5 Sheets-Sheet 1

Inventors
H. S. Clark
R. M. H. Clark
by J. Edw. Maybee
ATTY.

July 30, 1940.  H. S. CLARK ET AL  2,209,597
APPARATUS FOR HAND WEAVING
Filed April 16, 1936   5 Sheets-Sheet 2
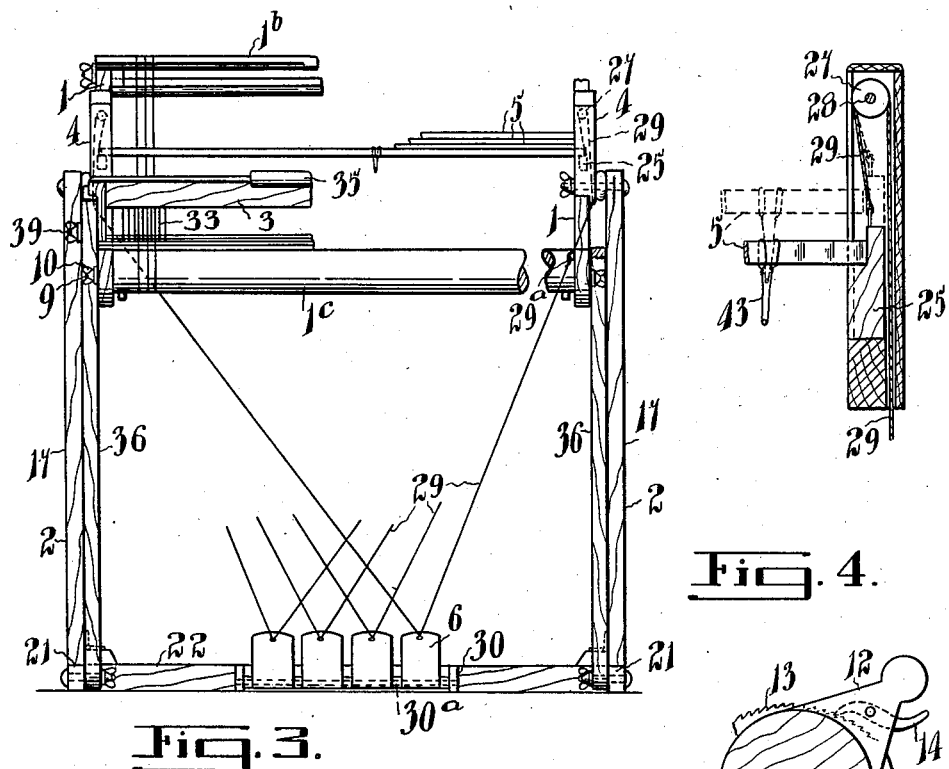
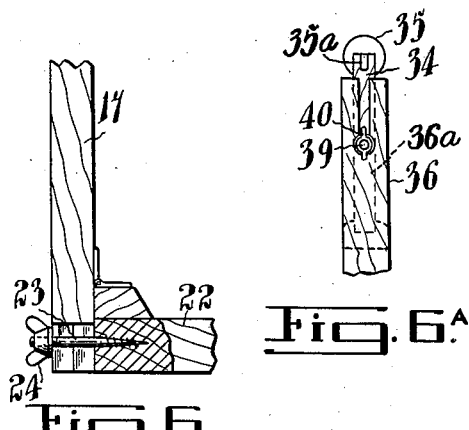
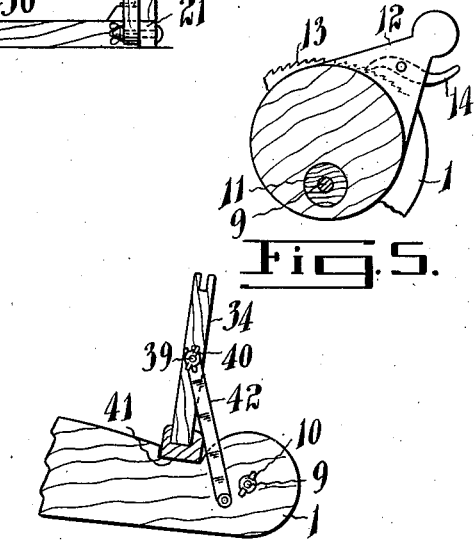
Inventors
H. S. Clark
R. M. H. Clark
by J. Edw. Maybee
ATTY

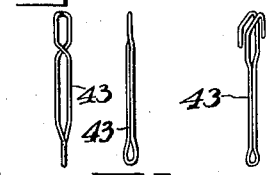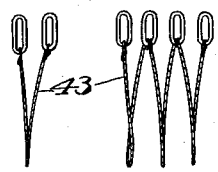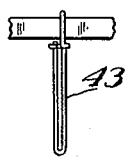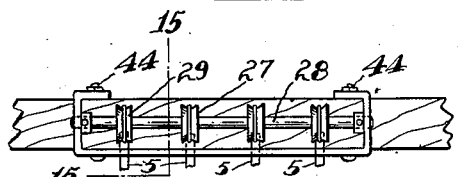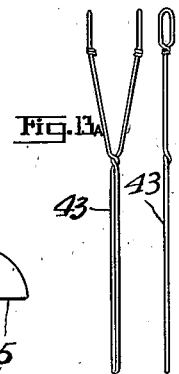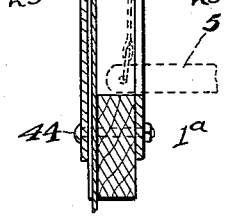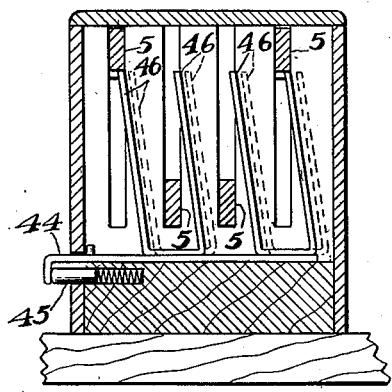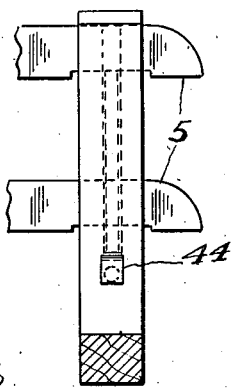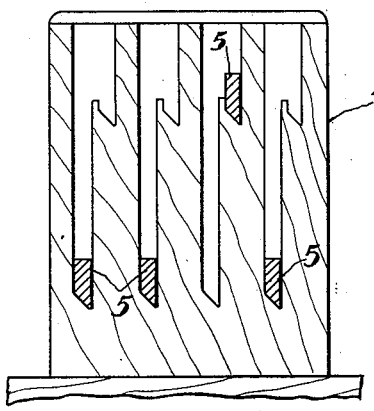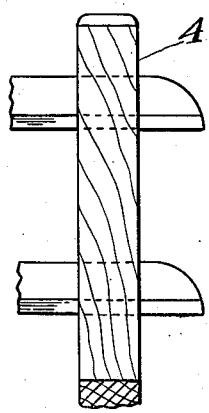

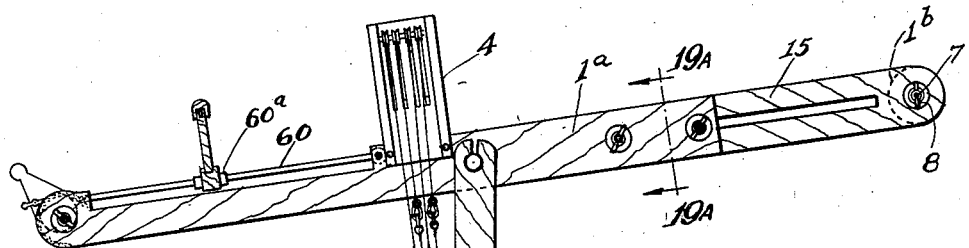
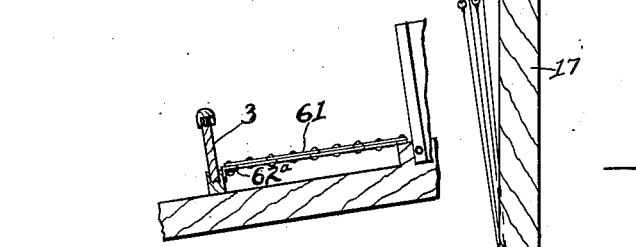
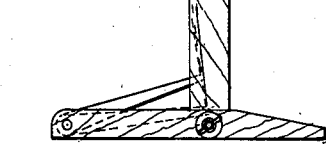
Fig. 19.A
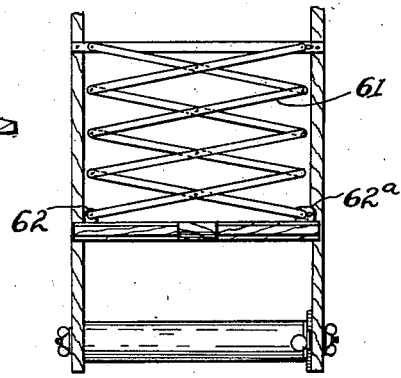
Fig. 19.B
Fig. 19.
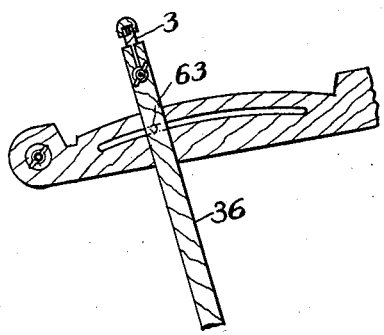
Fig. 19.C
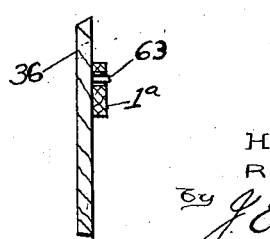
Fig. 21.
Fig. 20.
Inventors
H. S. Clark
R. M. H. Clark
By J. Edw. Maybee
ATTY July 30, 1940.  H. S. CLARK ET AL  2,209,597
APPARATUS FOR HAND WEAVING
Filed April 16, 1936  5 Sheets-Sheet 5
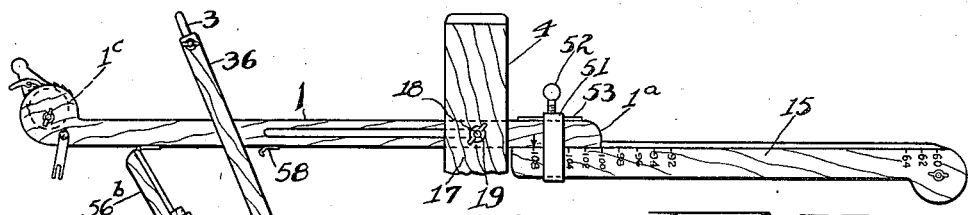
Fig. 22.
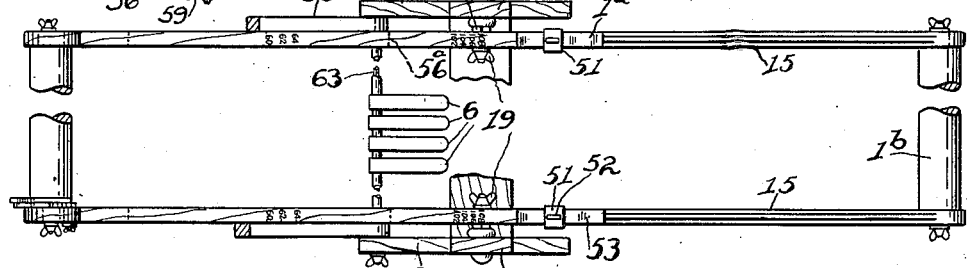
Fig. 23.
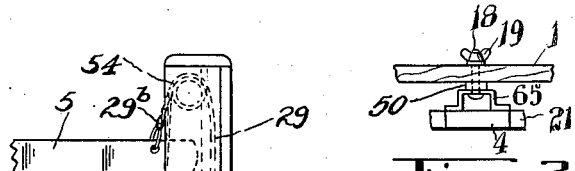
Fig. 26.
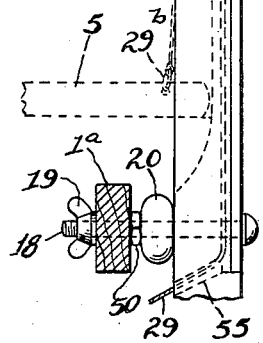
Fig. 25.
Fig. 24.
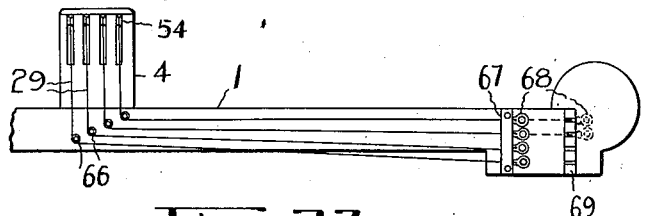
Fig. 27.
Inventors
H. S. Clark
R. M. H. Clark
by J. Edw. Maybee
ATTY Patented July 30, 1940

2,209,597

UNITED STATES PATENT OFFICE 2,209,597

APPARATUS FOR HAND WEAVING

Herbert Spencer Clark and Rosa M. Hewetson Clark, Scarborough Township, York County, Ontario, Canada Application April 16, 1936, Serial No. 74,632

12 Claims. (Cl. 139—33)

This invention relates to improvements in apparatus for hand weaving. The object of the invention is to construct a hand loom which will be simple and cheap to manufacture; which may be readily taken down and set up; which may be quickly and easily operated by any person without specialized technical training or experience; which will be capable of producing durable and practical woven materials in a wide range of patterns; and which is adapted to produce various desired widths and lengths of cloth. Other objects and advantages of the invention will be apparent during the course of the following description.

In the accompanying drawings, forming a part of this specification, and on which like numerals are employed to designate like parts throughout the same, Fig. 1 is a central longitudinal vertical section of one form of loom;

Fig. 2 a plan view of the form of loom shown in Fig. 1;

Fig. 3 is a front end view partly broken away of the form of loom shown in Fig. 1;

Fig. 4 is a vertical section of the heddle lift on the line 4—4 in Fig. 1;

Figure 1:
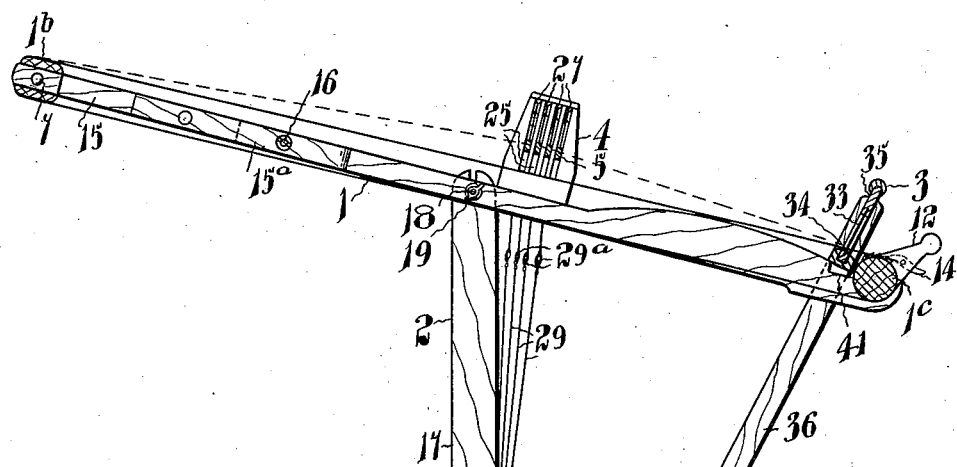

Fig. 5 an end view of the end roller showing the hardwood insert for mounting the stud;

Fig. 6 is a fragmentary vertical section of one leg and part of the base of the stand;

Fig. 6A a fragmentary end elevation of the beater mounted on the arm;

Fig. 6B a fragmentary end elevation of the beater mounted on the frame;

Figs. 7 and 7A front and side views of one form of heddle;

Figs. 8 and 8A front and side views of another form of heddle;

Figs. 9 and 9A front and side views of another form of heddle;

Fig. 10 perspective view of another form of heddle;

Fig. 11 perspective view of another form of heddle;

Fig. 12 perspective view of another form of heddle;

Fig. 13 side view of another form of heddle;

Figs. 13A and 13B front and side views of another form of heddle;

Fig. 14 a plan view of a modified form of heddle support;

Fig. 15 a vertical cross section on the line 15—15 in Figure 14;

Fig. 16 a side elevation, partly broken away, showing another modified form of heddle support;

Fig. 16A an end elevation of the form of heddle support shown in Fig. 16;

Fig. 17 a side elevation of another modified form of heddle support;

Fig. 18 an end elevation of the heddle support shown in Fig. 17;

Fig. 19 a side elevation of a modified form of frame, shown in conjunction with the form of heddle support illustrated in Figures 14 and 15 and a modified construction of beater guide;

Fig. 19A a section through a side member and extension piece of the frame on the line 19A in Fig. 19;

Fig. 19B a fragmentary side elevation of one end of the frame showing a further modification of beater guide;

Fig. 19C a plan view of the modified form of beater guide shown in Fig. 19B;

Fig. 20 a fragmentary side elevation of part of the frame illustrated in Fig. 1, showing a modification thereof;

Fig. 21 a vertical cross section in the line 21—21 in Fig. 20;

Fig. 22 a side view of a modified form of loom, partly broken away;

Fig. 23 a plan view of the form of loom illustrated in Fig. 22;

Fig. 24 a vertical section of the heddle support shown in Figures 22 and 23;

Fig. 25 a fragmentary side elevation showing construction of the stand for the form of loom illustrated in Figures 22 and 23;

Fig. 26 a plan view showing a modified method of mounting the stub shafts in the form of loom illustrated in Fig. 22 and Fig. 27 illustrates a modified form of heddle raising apparatus.

In the drawings like numerals of reference indicate corresponding parts in the different figures.

The loom comprises a frame 1, a stand 2, a beater 3, heddle supports 4, 4, heddle bars 5, 5, 5, 5, and treadles 6, 6, 6, 6.

The frame comprises two side members 1a 1a, and end members 1b and 1c commonly called the back beam and breast beam respectively.

Figure 2:
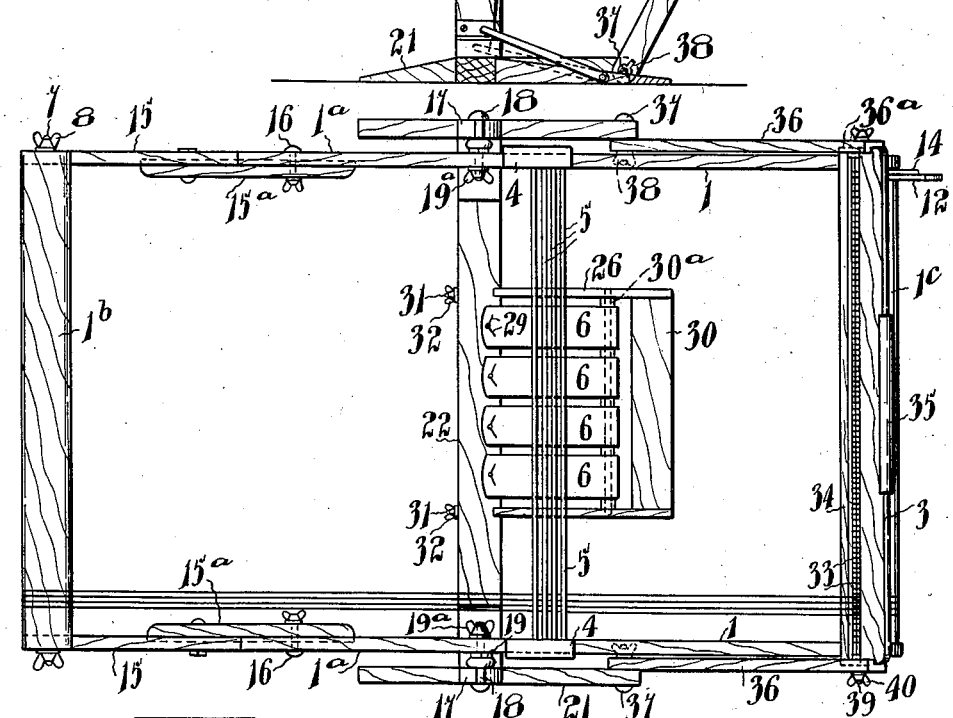

The end member 1b or back beam in Figures 1, 2 and 3 is illustrated as a pair of flat rectangular bars spaced by blocks which form a slot or groove at each end into which the side members 1a fit. A threaded stud or hanger bolt 7 extends from each end of the said end member 1b through a hole in the side members 1a of the frame, the end member 1ᵇ being secured to the frame by nuts 8 8, preferably wing nuts adapted to screw on the threaded stud at each end thereof.

The other end member 1ᶜ or breast beam, consists of a roller which is eccentrically mounted on the side members by means of off centre threaded studs or hanger bolts 9 extending from each end through a hole in the side members of the frame. Nuts 10, preferably wing nuts, screwed on the threaded studs 9 secure the end member 1ᶜ to the frame. The roller 1ᶜ is preferably of soft wood which is light in weight such as balsa and is provided with hard wood inserts 11, 11, into which the hanger bolts 9 are screwed. A lever 12 is secured to one end of the roller 1ᶜ, and secured to the side member 1ᵃ adjacent the lever 12 is a ratchet 13 which is adapted to be engaged by a pawl 14 on the lever 12. Pins may be provided extending from each end of the breast beam 1ᶜ for initially securing the ends of the warp threads. (See Fig. 3.)

The side members 1ᵃ, 1ᵃ in Figures 1, 2 and 3 are extensible, being provided with extension pieces 15. The ends of the side members 1ᵃ are provided with longitudinal grooves with holes extending between the bottom of said grooves and the outer side of the frame. The extension pieces 15 are provided with offset portions 15ᵃ, 15ᵃ, having tongues adapted to fit into the grooves in the side members 1ᵃ, and holes adapted to register with the holes in the side members, whereby the extension pieces 15 may be secured by bolts 16, 16 and nuts, preferably wing nuts, to the end of the side members. In Figures 1, 2 and 3 the extension is shown in place with the removable end member 1ᵇ secured thereto, its threaded studs 7 extending through holes in the ends of the said extension pieces 15.

The stand 2, as illustrated in Figures 1, 2 and 3 is collapsible and comprises two upright members 17, 17 provided with open grooves or notches at the top thereof adapted to receive stub shafts 18, 18 formed from bolts which extend through holes in the side members 1ᵃ and are secured therein by nuts 19, 19 and 19ᵃ, 19ᵃ, the latter being preferably wing nuts. Between the uprights and the side members are spacers 20, 20.

The uprights are provided with feet 21, 21 and are hingedly connected to a cross piece 22. The cross piece 22 is provided with hanger bolts 23, 23 which extend outwardly from each end and through slots in the base of the uprights 17, (see Figure 6). The uprights 17, 17 may be folded on the cross piece 22. When they are opened up and in their upright position the bolts 23 extend through the slots, and wing nuts 24, 24 may be screwed on the bolts 23 to hold the uprights in their upright position.

The heddle supports 4 are suitably mounted on the side members 1ᵃ, 1ᵃ on either side of the frame as illustrated in Figures 1, 2 and 3. The supports 4 are substantially rectangular boxlike structures, each provided with four vertical slots in the inner side thereof. Slidably mounted in each of said supports are four vertically slidable elevators 25, 25, 25, 25, each having a tongue 25ᵃ extending into a vertical slot and forming with the body of the elevator a rest or support for the ends of the heddle bars 5, (see Figure 4). Four pulleys 27, 27, 27, 27 are rotatably mounted on a shaft 28 which extends lengthwise through the support 4 close to the top thereof. Cords 29, 29, 29, 29 are secured to the elevators 25, pass over the pulleys 27 and down through openings in the base of the heddle supports 4 to the treadles 6. In each cord 29 below but near to the support 4 is a detachable connection 29ᵃ.

The treadles are swingably mounted on a frame 30 by means of a shaft 30ᵃ, and the frame 30 has hanger bolts 31, 31 at each end which extend through the cross bar 22 and are adapted to receive wing nuts 32 which detachably secure the frame 30 to the cross piece 22.

The beater 3 consists of a comb 33 mounted in a frame 34 having a removable top 35 which is provided with tongues 35ᵃ, 35ᵃ which fit into slots in the vertical side members of the frame 34 and which has a longitudinal slot in its lower side which fits over the teeth of the comb 33.

The beater is detachably mounted on swingable arms 36, 36 which are detachably pivoted to the feet 21 of the base by means of bolts 37, 37 and wing nuts 38, 38. The upper ends of the arms 36 are provided with grooves 36ᵃ, 36ᵃ into which the vertical side members of the frame 34 of the beater are adapted to fit. At each end of the beater frame are hanger bolts 39, 39 provided with wing nuts 40, 40. When the beater frame 34 is inserted in the grooves in the ends of the arms 36 the hanger bolts pass through slots in the ends of the said arms 36 and the beater may be held in position by tightening the wing nuts 40.

The side members 1ᵃ, 1ᵃ of the frame are provided with arcuate upper surfaces adapted to be engaged by the beater 3 as it is swung back and forth on the arms 36. The frame 1 is pivoted forward of the point of gravitational balance so that the arc shaped upper surfaces of the side members normally engage the under part of the frame of the beater member 3. In this way the frame 1 is held in a substantially stationary position while the loom is in operation.

A recess 41 is provided in each side member 1ᵃ adjacent the end member or breast beam 1ᶜ and at the end of the arc shaped portion. These recesses 41 are adapted to receive the frame 34 of the beater 3 when it has been removed from the arms 36. Braces 42, 42 are pivoted on the side members 1ᵃ and are provided with slots in their ends adapted to receive the hanger bolts 39, to support the beater 3 in the recesses 41 when the wing nuts 40, are tightened on the braces.

The mode of operation of the device is as follows:

The device is usually shipped in a knocked down condition. The warp frame is assembled with or without the extension pieces 15 by inserting the hanger bolts of the breast and back beams through the holes provided in the side members and screwing up the wing nuts. The stub shafts 18 are then secured in position on the frame by the hexagonal and wing nuts 19 and 19ᵃ. The uprights 17 of the stand, which have been folded one on the other, are raised and the wing nuts 24 screwed on the hanger bolts 23 to maintain the uprights in position. The arms 36 may also be pivotally mounted on the base by means of the bolts 37 and wing nuts 38. The shafts 18 are then inserted in the slots in the upper end of the uprights 17. The heddle supports 4 are usually permanently fixed to the warp frame 1, but if not they may be screwed or bolted to the frame in any suitable manner. The beater 3 is then inserted in the recesses 41 in the frame and secured therein by means of the braces 42. The removable top 35 of the beater is then removed leaving the teeth of the comb 33 exposed. A continuous warp thread is then wound or warped on the frame by passing it through successive teeth of the comb 33 and around the back beam 1b and breast beam 1c by rotating the warp frame on its axes 18.

When the warp threads have been wound on the frame and the top 35 of the beater 3 has been applied thereto, the beater is disconnected from the frame and is mounted on the arms 36 by inserting the frame 34 in the grooves at the upper ends of the arms 36 with the hanger bolts 39 extending through the slots, and tightening up the wing nuts 40.

Either before or after the beater 3 is mounted on the arms 36 the heddles 43 may be engaged with the warp threads and mounted on the heddle bars. Various types of heddles may be used as hereinafter described but in Figure 1 the heddle used is a flexible substantially U shaped wire provided at each end with loops adapted to fit over the heddle bars (see Figure 4). The warp threads are "picked up" one by one by means of the heddles. This is done by taking the heddles one at a time and hooking them under successive warp threads and then passing the heddle bars through the loops of the heddles until all of the warp threads pass through heddles and may be lifted by the heddles when the heddle bars are raised. For greater convenience the warp threads may first be picked up by a shed stick (not shown). In accordance with standard weaving practice two or more heddle bars may be used and the warp threads may be mounted successively on different heddle bars, or otherwise, depending upon the pattern desired.

When the selected number of heddles have been mounted on a heddle bar, the ends of the heddle bar are mounted on two opposite elevators 25 in the heddle supports 4. When all the heddles have been mounted and the bars are all in position in the supports the cords 29 may be connected. As illustrated particularly in Figure 3 a cord goes from each treadle 6 to corresponding opposite treadle elevators so that by operating one treadle a pair of opposite elevators 25 to which the cords are secured may be raised and one of the heddle bars lifted. The treadles 6 are so constructed that normally they are in a raised position supported by the cords 29. When they are pressed down they raise the elevators to which they are connected.

In operating the device the operator sits facing the loom with the breast beam above his lap and swings the beater 3 away from him to a position adjacent the heddle supports 4. He then presses down one of the treadles which lifts one of the heddle bars 5 which in turn raises the warp threads to which it is connected by the heddles, forming a "shed" between groups of the warp threads. The operator then passes a shuttle (not shown) through the shed. The shuttle carries the weft thread. The beater is then pulled toward the operator the teeth of the comb engaging the weft thread and carrying it forward to a position near the end member or breast beam 1c. The raised heddle bar is then dropped and the beater is returned to its position adjacent the heddle supports. Another heddle bar is raised and the shuttle is then passed through the "shed" in the opposite direction. The operation is repeated, the operator raising the heddles in a predetermined order.

After a certain amount of cloth has been woven, it is necessary to move the work around the frame to provide room for the weaving operation. This is done by releasing the pawl 14 and rotating the breast beam 1c by means of the lever 12 which is pushed backward or away from the operator. Owing to the eccentric mounting of the breast beam, this operation releases the tension on the warp threads so that the operator by pulling the beater forward moves the woven material around the breast beam 1c, to the under side of the warp frame and brings a new section of warp threads into weaving position on the upper side. By pulling the lever 12 forward again and engaging the pawl 13 with the ratchet 14 the warp is again brought under tension and the weaving can be recommenced. This sequence of operations may be repeated until all but a small portion of the warp is filled with the weft material. This unwoven section is then cut across and the finished material removed from the loom.

Various modifications of the heddle 43 are illustrated in Figures 7 to 13. In Fig. 7 is illustrated on an enlarged scale the type of a heddle shown in Figures 1 to 4 which comprises a U shaped wire provided with a loop at each end the planes of which are at right angles to the plane of the arms of the U-shaped portion of the heddle, and which loops are adapted to fit over a heddle bar. In Figure 8 the heddle is constructed of sheet metal material with a wide portion at the top in which is cut slots or holes through which the heddle bars may pass. In Figure 9 the heddle is constructed of resilient wire with hooks formed at the upper end thereof adapted to embrace a heddle bar. The two arms of the heddle cross below the hooks and form an elongated loop in the same plane as the hooks, which when pressed together spreads the hooks apart so that they may pass around the heddle bar. At the lower end of the heddle the arms are twisted to a plane at right angles to the plane of the hooks and elongated loop to carry a warp thread. The advantage of this latter construction of heddle is that the heddle bar may be mounted in the heddle support and the heddles connected to the bar instead of passing the bar through the heddles. Fig. 10 shows a construction provided with hooks adapted to engage the heddle bar, said hooks overlapping and having downward extensions. To secure this heddle to the heddle bar the hooks must be spread apart and the heddle pushed up with one end thereof on each side of the bar and then allowed to drop or be pulled down so that the downward extensions are on opposite sides of the bar. Figure 13 shows a heddle constructed of a narrow U shaped piece of resilient wire having a loop formed at one end thereof at right angles to the plane of the U shaped portion of the heddle. The end of the piece of wire which forms the loop is bent around the arm from which the loop is formed and forms a hook by which the other arm of the U shaped portion of the heddle may be caught. In Fig. 11 is shown a heddle comprising two metal loops connected by a piece of flexible material such as string or cord, which may be utilized in the same manner as the heddles illustrated in Figures 7 and 8. In Figure 12 is shown a heddle similar to the heddle disclosed in Figure 12 except that a plurality of heddles are formed of a plurality of metal loops with a continuous connecting string or cord. In Fig. 13A is shown a construction of heddle similar to that shown in Fig. 7, provided with an elongated downward extension below the bottom of the U-loop. The purpose of this is to guide the warp threads in their correct positions relative to one another.

Figures 14 and 15 show a modified construction of the heddle support 4 in which the frame is formed of sheet metal. The inner side of the frame is provided with slots to receive the ends of the heddle bars 5. The ends are cut and formed so that the support may fit over the side members 1ª of the warp frame and may be connected by bolts or rivets 44 extending through side member 1ª of the warp frame and the inner and outer sides of the heddle support. Pulleys 27 are rotatably mounted on a shaft 28 which is mounted longitudinally of the heddle support and is held in position by collars secured adjacent the ends of the shaft. The cords 29 pass over the pulleys and are provided with hooks at their ends adapted to engage in holes in the ends of the heddle bars. The heddle support is open at its back as will be seen from Fig. 14 and the cords 29 extend downwardly around the side members 1ª of the warp frame and thence to the treadles.

In Figs. 16 and 16ª is shown a still further modification of heddle support. In this construction the support is provided with four slots extending from one side to the other thereof through which the ends of the heddle bars 5 may pass. A horizontal bar 44 is slidably mounted within the heddle support and extends outwardly through one end thereof, its front end being turned down at a right angle. A spring pressed pin 45 engages the down turned end of the slidable bar 44 tending to force it outwards. Catches 46 are mounted on the bar 44 and when the bar is moved outwardly by the pressure of the pin 45 these catches 46 will normally engage the under part of the heddle bars, when raised, to maintain them in a raised position. In operation the heddle bar is lifted in the slot by grasping its ends and raising it. As it is lifted it engages one of the catches 46 forcing the said catch and the slidable bar backward or inward. When the bar reaches the top of the slot the slidable bar slides outward under the pressure of the spring pin 45 and the catch 46 returns to its normal position beneath the heddle bar, thus holding said bar in a raised position. To release the heddle bar the slidable bar may be pushed inwardly causing the catches to retract permitting the heddle bar to drop. The end of the slidable bar 44 is so positioned that it may be engaged by the beater to cause it to retract and permit the raised heddle bar or heddle bars to drop. This saves the operation of disengaging or lowering the heddle bars by hand in a form of loom in which the heddle bars are raised by hand.

In Figures 17 and 18 is illustrated a simplified type of heddle support 4 in which a plurality of slots are formed therethrough. The heddle bars are adapted to extend through these slots. The slots are each provided with a long leg and a short leg. The heddle bars normally rest at the bottom of the long legs, and the bottom of the heddle bars and the bottom of the legs may be cut on an incline as indicated. To raise a heddle bar the ends are lifted and the bar is lifted to the top of the slot in which it is mounted an then pushed backward and allowed to drop into the short leg of the slot, the bottom of which is also cut on an incline so as to hold the heddle bar more firmly upright in the slot. To drop the heddle bar it is lifted out of the short leg and moved forward and allowed to drop to the bottom of the long leg.

In Figure 19 is shown a modified construction of a frame of the loom. The side members 1ª are of greater height than in Figures 1, 2 and 3. The end member or back beam 1ᵇ is in roller form and is secured to the side members 1ª by means of hanger bolts and wing nuts. By loosening the wing nuts the roller may turn and thus facilitate shifting of the warp threads. The extension pieces 15 are each provided with a central longitudinal slot which co-operates with a tongue on the side member 1ª. The side member is provided with holes which register with the slots in the extension piece and are adapted to receive bolts whereby the extension piece may be bolted to the frame. Fig. 19ᴬ is a cross section of the frame and extension piece showing the adjustable connection. The heddle support 4 in Fig. 19 is the same construction as illustrated in Figures 14 and 15. The side members 1ª of the frame between the heddle supports and the breast beam is cut away, as illustrated, and the beater 3 is slidably mounted on rods 60 which extend across the cut away portion of the side members 1ª. The beater frame is fitted with long sleeve bushings 60ª through which the rods pass maintaining the beater in a position parallel to the breast beam during its motion.

In Figures 19ᴮ and 19ᶜ the beater comb 3 is mounted on lazy tong levers 61, secured at one end to the side members 1ª adjacent the heddle supports, being fixed in position at one side and having a transverse sliding mounting at the opposite side. The beater 3 is provided with brackets 62 and 62ª the latter having a slot to provide a transverse sliding motion to which the ends of the lazy tong levers 60 are connected.

Figures 20 and 21 show an alternative construction of frame in which arcuate slots are cut in the side members and the arms 36 are provided with pins 63 which are adapted to extend into said slots to maintain the warp frame in a substantially constant position.

Figures 22, 23 and 24 show a further modification of the loom. In the construction there illustrated the heddle supports 4 are mounted on or formed from the uprights 17 of the stand 2. The side members 1ª are provided with longitudinal horizontal slots to provide an adjustable fulcrum point for the shafts 18. As illustrated in Figure 24 a nut 50 is screwed on the shaft 18 between the side member 1ª and the spacer 20 so that when the shaft 18 is positioned in the slot in the side members 1ª in a position where the frame is balanced, the position of the shaft 18 may be maintained by tightening the wing nut 19 so as to clamp the side member 1ª between said wing nut 19 and the nut 50. The extension piece 15 is provided with a tongue on its top and the side member 1ª is provided with a groove along its bottom. The extension 15 may be adjusted to provide the desired length of warp frame and is held in the desired position by means of a clamp 51 which passes around the side members 1ª and the extensions 15 the clamp being provided with a set screw 52 adapted to bear on a metal bearing plate 53. The warp frame is provided with a set of calibrations on each of the members 1ª and the extension 15 to indicate the length of cloth which may be woven for various settings of the extension. The calibrations are placed on both sides in order that they may be set alike to ensure an exact rectangular setting of the warp frame. The top of the side members 1ª above the slots therein are similarly calibrated to indicate the point at which the shaft 18 must be secured to the warp frame in order to properly balance the said frame for the various corresponding positions of the extension. The main purpose of balancing the frame is to facilitate it being easily rotated for winding the warp thread as previously described. The back beam 1ᵇ which is preferably a roller such as is shown and described in Figure 19 is preferably mounted with the upper part of its circumference on a plane with the lower part of the circumference of the breast beam 1c. The purpose of this is to bring the line of the warp thread slightly below the bottom of the heddles when mounted on the heddle bars so that when the warp threads are passed through the heddles the threads will be slightly raised and at a tension.

The heddle support 4 is provided with slots in its inner face and is cut from the upper end of the upright 17. The cords 29 pass over a smooth round metal tube 54, pass down inside the back of the heddle lift 4 and through diagonal holes designated as 55 in the upright 17 and from thence to the treadles. The ends of the cords are clipped through holes in the heddle bars by means of releasable hooks or clasps 29b which are preferably so constructed that they will not pass through the slots in the heddle lift.

To retain the warp frame in a rigid position while the loom is in use supports 56, 56 are provided (see Figures 22 and 23). They comprise parts 56a, 56a which are pivotally mounted on the feet 21 of the stand and parts 56b, 56b which are hinged to the under side of the side members 1a of the frame. Parts 56a and 56b may be secured together by a clamp 57. When the loom is dismantled or when the warp thread is being wound thereon the parts 56a and the parts 56b are disconnected and the part 56b may be swung up beneath the side members 1a and held in position there by means of a spring clip 58 which engages a catch 59 in the end of said support member 56b.

As illustrated in Fig. 23 the supports 56, the beater arms 36 and the treadles 6, may all be swingably mounted on a transverse shaft 63 extending between the feet 21 of the stand 2.

In Fig. 25 the mode of assembly of the stand is illustrated. The cross piece 22 has an angle iron 64 secured to each end. The uprights 17 are provided with holes adapted to register with holes in the angle irons and to receive the hanger bolts 23 in the ends of the cross piece 22. The uprights 17 may be secured to the cross piece 22 by screwing wing nuts 24 on the hanger bolts 23 and by bolting the uprights to the angle irons.

Fig. 26 illustrates a modified way of mounting the stub shafts 18, particularly applicable to the form of loom illustrated in Fig. 22. A U-shaped bracket 65 is bolted or screwed to the upright 17. A vertical slot is cut in the base of the bracket into which the shaft may be dropped with the head of the shaft bolt on the inside of the bracket and the hexagonal nut 50 on the other side of the bracket. The shaft 18 may then be secured to the frame in the desired position by tightening the wing nut 19. The advantage of this method of mounting the frame is that it may be removed from the stand 2 for adjustment and mounted on the frame after adjustment merely by slipping the ends of the shafts 18 in the slots in the brackets 65.

Fig. 27 illustrates a modified form of heddle raising apparatus in which the heddle supports 4 are mounted on the side members 1. Each heddle support has slots extending therethrough adapted to receive the ends of heddle bars and cords 29 are secured to the heddle bars, pass over a tube 54, around pulleys 66, 66, 66, 66, mounted on the side member 1 of the frame, run parallel to and adjacent to the outer side of the side member and through holes in a block 67 secured to the side member 1. At the ends of the cords are finger rings 68, 68, 68, 68. Secured to the frame and spaced from the first mentioned block 67 is a block 69 provided with slots in alignment with the holes in the block 67. To raise a heddle bar the cords attached to the ends thereof are pulled forward by means of the finger rings 68 on the end thereof and inserted in one of the grooves in the block 69. The ring 68 prevents the cord from sliding through the slot and the cord is thus held in its forward position with the heddle bar raised until pulled out of the slot by the operator when the weight of the heddle bar plus the warp tension will pull the cord back allowing the heddle bar to drop.

What we claim as our invention is:

1. In apparatus for hand weaving, the combination of a frame over which the warp threads may be stretched including side members and end members; a stand for the frame; means for separating threads to create a "shed"; arms pivotally mounted on the stand and adapted to swing lengthwise of the frame on either side thereof, each of said arms having a longitudinal groove in its free end and slots extending between the bottom of said groove and the outer side of the arm; a beater comb, comprising vertical teeth and a frame, the ends of said frame being adapted to fit into the grooves in the arms and each of said ends having a threaded stud or bolt extending outwardly therefrom and adapted to pass through the slots in the ends of the arms; and nuts adapted to be screwed on said studs to secure the comb to the arms.

2. In apparatus for hand weaving, the combination of a frame over which the warp threads may be stretched including side members and end members; a stand on which the warp frame is rotatably mounted; means for separating threads to create a "shed"; arms pivotally mounted on the stand and adapted to swing lengthwise of the frame on either side thereof; a comb beater adapted to be secured to the free ends of the said arms; and means cooperating with the arms and frame to maintain the warp frame in a substantially constant position as the comb is swung back and forth by the operator.

3. In apparatus for hand weaving, the combination of a frame over which the warp threads may be stretched including side members and end members, the upper edge of the side members adjacent one end being arcuate in form; a stand on which the warp frame is rotatably mounted; means for separating threads to create a "shed"; arms pivotally mounted on the stand and adapted to swing lengthwise of the frame on either side thereof; and a comb beater adapted to be secured to the free ends of the said arms, the arc-shaped edge of the side members being adapted to engage the comb as it is swung back and forth by the operator to maintain the warp frame in a substantially constant position.

4. In apparatus for hand weaving, the combination of a frame over which the warp threads may be stretched including side members and end members, the side members adjacent one end being provided with transverse arcuate slots; a stand for the frame; means for separating threads to create a "shed"; arms pivotally mounted on the stand and adapted to swing lengthwise of the frame on either side thereof, said arms being provided with pins adapted to travel in the arcuate slots in the frame; and a comb beater adapted to be secured to the free ends of the said arms.

5. In apparatus for hand weaving, the combination of a frame over which warp threads may be stretched, including end members, side members and adjustable extension pieces; a stand; longitudinal horizontal slots in the side members; and means for rotatably mounting the frame on the stand, said means being adapted to extend through said slots and to be adjustably positioned therein.

6. In apparatus for hand weaving, the combination of a frame over which warp threads may be stretched, including end members, side members and adjustable extension pieces; longitudinal slots in the side members; stub shafts adapted to extend though said slots and to be adjustably secured in position therein; and a stand on which the frame is adapted to be rotatably mounted by means of said stub shafts.

7. In apparatus for hand loom weaving, a warp frame; a stand on which the warp frame is rockably mounted; and an adjustable extensible support extending between the frame and the stand adapted to retain the frame substantially rigid at the desired weaving position.

8. In apparatus for hand loom weaving, a warp frame; a stand on which the warp frame is rotatably mounted; and a disconnectible support extending between the frame and the stand adapted to retain the frame substantially rigid, said support being adapted to be disconnected to permit rotation of the frame for warping.

9. In apparatus for hand loom weaving, a warp frame having extensible side members and a breast beam and back beam; a stand for said frame; and an extensible support extending between the frame and the stand.

10. A collapsible stand for apparatus for hand loom weaving comprising uprights having transverse feet secured to the lower end thereof; a cross-piece extending between said feet; hinges secured to the cross-piece and the uprights; threaded studs or bolts extending from the ends of the cross-pieces; the feet having slots therein through which said studs extend when the stand is set up; and nuts adapted to be screwed on the threaded studs to retain the uprights in their set-up position.

11. In apparatus for hand weaving, the combination of a frame over which warp threads may be stretched, including end members, side members and adjustable extension pieces; longitudinal slots in the side members; stub shafts adapted to extend through said slots and to be adjustably secured in position therein; a stand on which the frame is adapted to be rotatably mounted by means of said stub shafts; calibrations on the extension pieces to indicate the length of the warp; and corresponding calibrations on the side members of the frame along said slots to indicate the point of balance of the frame.

12. In apparatus for hand loom weaving, the combination of a frame over which warp threads may be stretched, including end members and side members; adjustable extension pieces; clamps for securing the extension pieces to the side members; calibrations on the extension pieces to indicate the length of the warp; slots in side members; stub shafts rotatably mounted on the stand adapted to be adjustably secured in said slots; calibrations on the side members corresponding to the calibrations on the extension pieces to indicate the balance point of the frame; heddle supports mounted on the stand; heddle bars adapted to be mounted on the supports; a beater; and adjustable disconnectible supports for the frame.

HERBERT SPENCER CLARK.
ROSA M. HEWETSON CLARK.